United States Patent [19]
Narumi

[11] 3,731,460
[45] May 8, 1973

[54] REGENERATIVE FILTRATION APPARATUS

[75] Inventor: Natsuo Narumi, Kobe City, Japan

[73] Assignee: Mitsubishi Jukogko Kabushiki Kaisha, Tokyo, Japan

[22] Filed: Dec. 16, 1970

[21] Appl. No.: 98,590

[52] U.S. Cl. .........................55/179, 55/198, 55/356
[51] Int. Cl. ..............................................B01d 53/04
[58] Field of Search.........................55/179, 54, 180, 55/198, 356, 357; 210/333, 411

[56] References Cited

UNITED STATES PATENTS

| | | | |
|---|---|---|---|
| 1,872,783 | 8/1932 | Miller | 55/179 X |
| 3,324,631 | 6/1967 | Kreuter | 55/179 X |
| 3,380,591 | 4/1968 | Muller | 210/333 X |
| 3,487,608 | 1/1970 | Graff | 55/179 X |
| 3,559,809 | 2/1971 | Barmore | 210/411 X |
| 1,616,242 | 2/1927 | Voress et al. | 55/180 X |
| 2,379,321 | 6/1945 | Sutcliffe et al. | 55/180 |

*Primary Examiner*—John Adee
*Attorney*—McGlew and Toren

[57] ABSTRACT

A regenerative filtration apparatus comprising at least one filter unit having the rein casings and valves to switch the flow direction of a fluid to be filtered, and a regenerative unit having therein separate passageways for the fluid to be filtered and the regenerated fluid, said units being provided with communicating means which are adapted to be connected together to form passageways between said units for guiding said fluids therebetween.

5 Claims, 12 Drawing Figures

Patented May 8, 1973

INVENTOR.
NATSUO NARUMI
BY
McGlew and Toren
ATTORNEYS

REGENERATIVE FILTRATION APPARATUS

BACKGROUND OF THE INVENTION

This invention relates to a filtration apparatus which removes a certain component from a fluid and subsequently regenerates and recovers the same.

Conventional regenerative filtration apparatus of this type, each built in a single container, have been limited in size. Intricate piping designed to reduce the overall container size have combined with dimensional restrictions for shipment to limit the quantity of the fluid such as a gas to be treated to 2,000 cubic meters or less per hour, thus making it impossible to manufacture any larger apparatus.

Where a blower driven by a four-pole motor of a low noise level is adopted in an attempt to abate the noise nuisance of ordinary motor-driven blowers, the blower must have such large dimensions that it cannot be accommodated in the casing of the filtration apparatus, and the packing expenses for long-distance transportation has to be accordingly increased to disadvantage.

SUMMARY OF THE INVENTION

The present invention has for a fundamental object to provide a regenerative filtration apparatus which is free of the foregoing disadvantages.

Another object of the invention is to provide a regenerative filtration apparatus which comprises at least a filter unit accommodating therein filter casings and valves to switch the flow direction of the fluid to be filtered, and a regenerative unit accommodating therein pipes through which the fluid to be filtered and the regenerated fluid pass, said units being provided with pipe flanges which when connected together define passageways for the fluids therebetween, the apparatus thus being adapted to be transported very conveniently and easily at low cost and capable of treating a large quantity of fluid.

As stated, the whole apparatus of the invention is roughly divided into two in construction; i.e. at least one filer unit accommodating therein filter casings and valves to switch the flow direction of the fluid to be filtered, and a regenerative unit accommodating therein pipes through which the fluid to be filtered and regenerated fluid pass. Therefore, the individual units can be built to conform to the international standards for the dimensions of containers for marine transportation, thereby eliminating the packing cost which is otherwise incurred, materially reducing the loading and unloading cost, and permitting the transportation of the apparatus by land or sea with utmost ease. Additional advantages associated with the standardization of the individual units are that the variety of component parts is decreased, quantity production of the units is made possible, and hence the manufacturing cost is considerably lowered.

Further, according to the present invention, the individual units are provided with pipe flanges which when connected together form passageways for the fluids between the units, and therefore arrangements of different scales, small and large in capacity, can be obtained as desired by selecting suitable combinations of the individual units. The apparatus thus manufactured is simple to instal and requires only a limited floor space.

Other objects, advantages and features of the present invention will become apparent from the following detailed description taken in conjunction with the accompanying drawings.

DETAIL OF THE INVENTION

Figure 1:
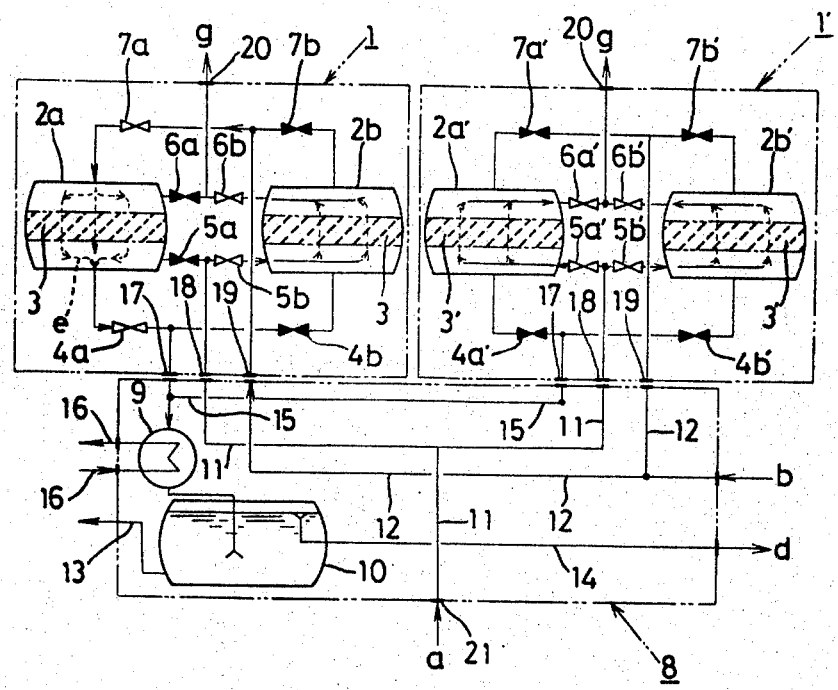
FIG. 1 is a schematic view explanatory of a regenerative filtration apparatus embodying the present invention.

The present invention will now be described in detail with reference to the accompanying drawings showing embodiments thereof in which a certain component of gas is adsorbed by an adsorbent and removed, and the adsorbed component is driven off from the adsorbent and then led to a condenser, where it is condensed for regeneration and recovery. Throughout the figures, numerals 1, 1' designate filter units each having rectangular parallelepiped casing that complies with the dimensional requirements of internationally standardized containers for marine transportation. The filter unit 1 accommodates adsorption columns 2a, 2b, and the filter unit 1' accommodates adsorption columns 2a' and 2b'. The two pairs of adsorption columns 2a, 2b, 2a', 2b' are packed with layers 3, 3' of an adsorbent, e.g., activated carbon, one layer for each column. The spaces below the activated carbon layers 3 in the adsorption columns 2a, 2b are communicated to each other with pipes equipped with pairs of change-over valves 4a, 4b and 5a, 5b. The spaces above the activated carbon layers 3 are communicated to each other with pipes equipped with pairs of change-over valves 6a, 6b and 7a, 7b. Similarly, the spaces below the activated carbon layers 3' in the adsorption columns 2a', 2b' are communicated to each other with pipes equipped with pairs of change-over valves 4a', 4b' and 5a', 5b', and the spaces above the activated carbon layers 3' are communicated to each other with pipes equipped with pairs of change-over valves 6a', 6b' and 7a', 7b'.

A regenerative unit is generally indicated at 8 as accommodating a condenser 9 and a separator 10. Like the filter unit 1, this regenerative unit has a casing which conforms to applicable standards for its dimensions. Inside the unit 8, there are arranged a multiple piping 11 which provides passageways for the gas $a$ containing a certain component to be adsorbed, a multiple piping 12 which provides passageways for a fluid, such as steam $b$, with which the adsorbed component is driven off, pipes 13, 14, respectively, for the drain water $c$ separated by the separator 10 and for the regenerated component $d$, and pipes 15, 16 as passageways for evaporated gas $e$ and cooling water $f$, respectively.

Between the filter unit 1 and the regenerative unit 8, there are provided flanges 17, 18, 19 through which the evaporated gas $e$, the gas $a$ containing the component to be adsorbed, and the steam $b$ pass, respectively. The evaporated gas pipe 15 of the regenerative unit 8 is disengageably connected to the change-over valves 4a, 4a' in the filter unit 1 via the evaporated gas flange 17. The multiple piping 11 is disengageably connected to the change-over valves 5a, 5b, 5a', 5b' via the adsorbable-component-containing gas flanges 18. The multiple piping 12 is disengageably connected to the change-over valves 7a, 7b, 7a', 7b' via the steam flanges 19.

The filter units 1, 1' are provided with discharge ports 20 in communication with the pairs of change-over valves 6a, 6b and 6a' and 6b', so that the gas $g$ from the adsorption columns 2a, 2b, 2a', 2b' where the gas component to be adsorbed has been adsorbed and removed from the gas, can be discharged through the ports 20.

Figure 2:
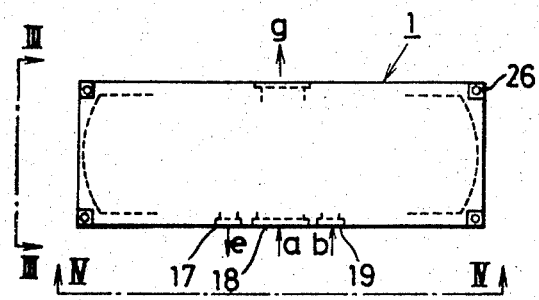
FIG. 2 is a side view of a filter unit of the above embodiment.
Figure 3:
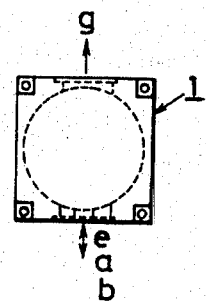
FIG. 3 is a view as seen from the side indicated by arrow marks III—III in FIG. 2.
Figure 4:
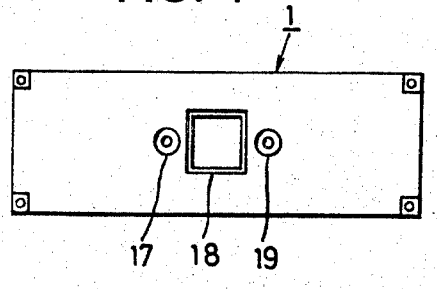
FIG. 4 is a view as seen from the side of arrow marks IV—IV in FIG. 2.
Figure 5:
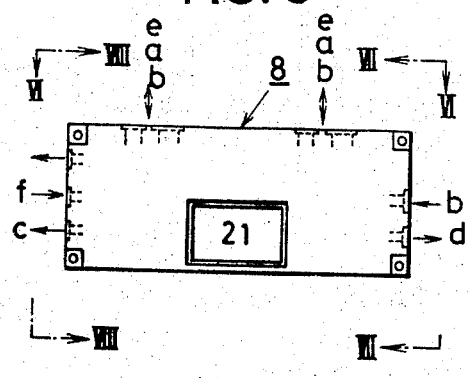
FIG. 5 is a side view of a regenerative unit of the above embodiment.
Figure 7:
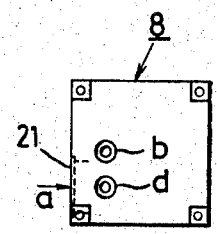
FIG. 7 is a view as seen from the side of arrow marks VII—VII in FIG. 5.
Figure 6:
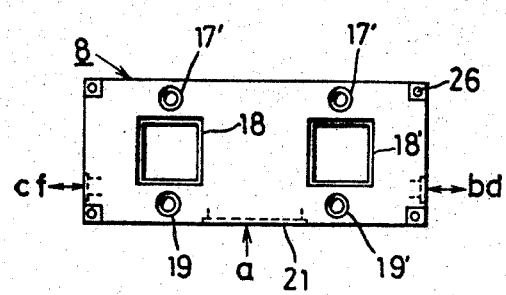
FIG. 6 is a view as seen from the side of arrow marks VI—VI in FIG. 5.
Figure 8:
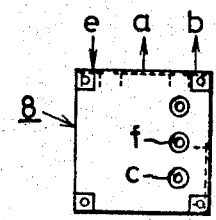
FIG. 8 is a view as seen from the side of arrow marks VIII—VIII in FIG. 5.

At the bottom of the filter unit 1, as better shown in FIGS. 2 to 4, the evaporated gas flange 17, adsorbable-component-containing gas flange 18 and steam flange 19 are provided in a straight line along the longitudinal axis of the filter unit, and in the top center of the filter unit 1 is formed a discharge port 20.

On the top surface of the regenerative unit, as better shown in FIGS. 5 to 8, there are provided the pairs of evaporated gas flanges 17, 17', adsorbable-component-containing gas flanges 18, 18' and steam flanges 19, 19' in a parallel pair of rows across the longitudinal axis and over the width of the unit. In the center of the front side of the regenerative unit 8 is formed a feed port 21 for the gas $a$ containing a component to be adsorbed.

Figure 11:
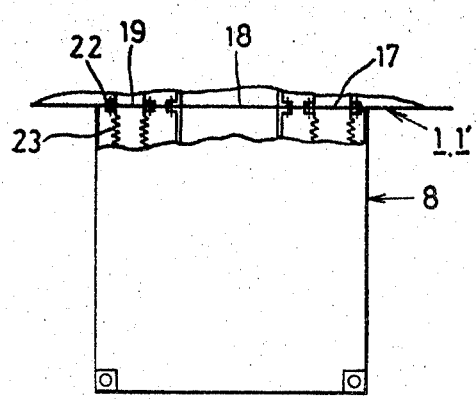
FIG. 11 is an exaggerated view, in vertical section, of joints formed in the apparatus.

As illustrated in FIG. 11, the flanges 17, 17', 18, 18', 19, 19' are fastened together with bolts 22.

Where finishing the flanges 17, 17', 18, 18', 19, 19' flush with the top surface involves technical difficulty or unreasonable cost, some of the flanges, e.g., the flanges 17', 19', may be replaced by bellows 23, or the pipes to be connected to the flanges 17', 19' may be replaced by pipes formed of a plastic material.

Figure 12:
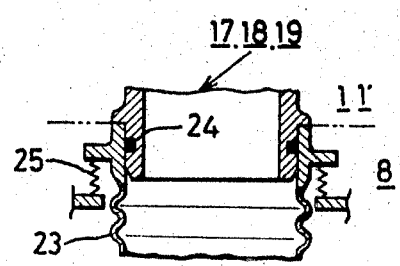
FIG. 12 is an exaggerated view, in vertical section, of joints formed in another embodiment of the invention.

Instead of bolting the flanges 17, 17', 18, 18', 19, 19', it is further possible to form them as socket and spigot joints as illustrated in FIG. 12, with an O ring 24 establishing a hermetical seal of each joint and either of the mating members of the flanges 17', 18', 19' being each supported by a compression spring 25.

Reference numeral 26 denotes hangers provided on upper corners of the filter units 1, 1' and the regenerative unit 8 and which conform to the hanger requirements for internationally standardized containers.

Figure 9:
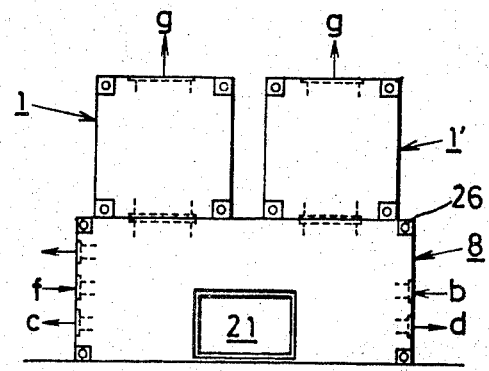
FIG. 9 is a front view of an apparatus as assembled of a regenerative unit and two filter units placed thereon.
Figure 10:
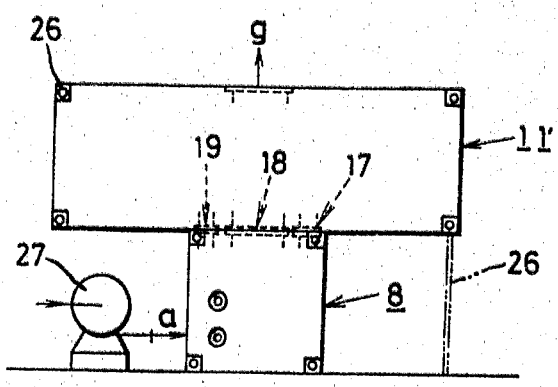
FIG. 10 is a side view of the above apparatus.

With the construction above described, an embodiment of the invention is installed as shown in FIGS. 9 and 10. First, the regenerative unit 8 is set on a foundation, and the two filter units 1, 1' are placed on the regenerative unit 8, in the direction at right angles to the longitudinal axis of the regenerative unit so that the flanges 17', 18', 19' at the bottom of the filter units 1, 1' exactly mate with the two rows of flanges 17, 18, 19 on the top of the regenerative unit 8. The flanges 17, 17', 18, 18', 19, 19' are securely fastened with bolts 22, and then the filter units 1, 1' are fixed in position with the hooks 26 for lifting standardized containers. In this manner the regenerative filtration apparatus is assembled with extreme simplicity.

The apparatus is operated in the following way. The change-over valves 4a, 5b, 5a', 5b', 6a', 6b', 7a are opened, and the change-over valves 4b, 4a', 4b', 5a, 6a, 7b, 7a', 7b' are closed (shown solid or in black), and then a gas $a$ containing a component to be adsorbed is fed through the feed port 21 into the multiple piping 11. The gas $a$ flows into the adsorption columns 2b, 2a', 2b' through the flange 18 and via the change-over valves 5b, 5a', 5b' of the filter units 1, 1', the component to be recovered from the gas $a$ is caught and adsorbed by the activated carbon layers 3, 3' in the adsorption columns 2b, 2a', 2b', and the purified gas $g$ is discharged via the change-over valves 6b, 6a', 6b' and through the discharge ports 20.

Meanwhile, steam $b$ is supplied to the multiple piping 12 and cooling water $f$ is supplied to the pipe 16. The steam $b$ flows into the adsorption column 2a of the filter unit 1 via the flange 19 and the change-over valve 7a, and passes through the activated carbon layer 3 in the column 2a, thus re-evaporating the component $d$ adsorbed by the activated carbon layer 3 to form an evaporated gas $e$. The gas then flows through the change-over valve 4a and the flange 17 into the condenser, where it is indirectly cooled by the cooling water $f$ to a liquid form. The liquefied gas is separated by the separator 10, and the drain water $c$ is drained through the pipe 13, while the component $d$ is recovered from the pipe 14.

After the lapse of a certain period of time, the adsorbed component $d$ is reaerated from the activated carbon layer 3 in the adsorption column 2a, and the component $d$ of the gas $a$ containing the same is fully adsorbed. Then, all of the change-over valves 4a, 4b, 5a, 5b, 6a, 6b, 7a, 7b in the filter unit 1 are set to the reverse flow directions.

That is to say, the change-over valves 4b, 5a, 6a, 7b (shown solid or in black) are opened, the change-over valves 4a, 5b, 6b, 7a are closed, the gas $a$ which contains the component to be adsorbed is introduced through the feed port 21, and steam $b$ is supplied to the multiple piping 12. In this way the adsorbable-component-containing gas $a$ is fed into the adsorption columns 2a, 2a', 2b', the particular component is adsorbed, and then steam $b$ is introduced into the adsorption column 2b for the regeneration purpose.

By reversing the flow directions of the change-over valves and causing each of the four adsorption columns 2a, 2b, 2a', 2b' to carry out the regeneration successively at suitable intervals, it is possible to maintain the adsorptive power of the adsorption columns 2a, 2b, 2a', 2b' above a certain level.

The embodiment shown is adapted for transportation, particularly by sea, with a high efficiency and at a low cost, because the filter units 1, 1' and the regenerative unit 3 conform to the applicable dimensional standards of internationally standardized containers for marine transportation.

In addition, because the filter units 1, 1' are placed on the regenerative unit 8 at right angles thereto, a blower 27 for feeding the adsorbable-component-containing gas a can be located under the overhangs of the filter units 1, 1' (as shown in FIG. 10), thus appreciably saving the floor space required for the installation of the apparatus.

It is further possible to fabricate a filtration apparatus of a desired capacity, large or small, by suitably combining the filter unit 1 and the regenerative unit 8, which may have wide varieties of size and capacity.

Although the present invention has been described hereinabove in connection with a preferred embodiment thereof, it should be of course understood that the present invention is not limited thereto but numerous modifications and alterations in the design are possible without departing from the spirit and scope of the invention.

What is claimed is;

1. A compact, self-contained regenerative filtration apparatus comprising at least one filter unit in which a first fluid is filtered for absorbing a certain component from the first fluid and a regnenerative unit for processing a second fluid used for removing the absorbed component of the first fluid from said filter unit, said filter unit including a rectangular parallelepiped casing, at least two filters disposed within said casing and each containing absorbing material for removing the certain component from the first fluid directed through said filters means including separate flow passageways and valves for the first and second fluids for selectively and separately flowing the first fluid and second fluid through said filters, said regenerative unit comprises a rectangular parallelepiped casing, means located within said regenerative casing for regenerating the second fluid, separate passageways located within said regenerative casing for supplying the first and second fluids to said filter casing and for returning the second fluid to said regeneration means after its passage to said filters in said filtered casing, means associated with said filter unit casing and said regenerative unit casing for closely interconnecting said casings with said filter casing superposed on said regenerative casing and with the connections between said passageways in said filter casing and said regenerative casing aligned for guiding the flow of first and second fluids between said flow passageways in said filter casing and said separate passageways in said regenerative casing for effecting passage of the first and second fluids from said regenerative casing to said filter casing and for returning the second fluid after its passage through said filters to said regenerative casing, and hangers secured to the upper corners of each of said filter casing and said regenerative casing.

2. A regenerative filtration apparatus, as set forth in claim 1, wherein said means for regenerating said second fluid comprises a condenser arranged to receive the second fluid from said filter unit, a separator arranged to receive the condensed second fluid from said condenser, and passageway means for flowing a cooling fluid through said condenser.

3. A regenerative filtration apparatus, as set forth in claim 1, wherein said filter unit includes a plurality of said filter casings with each said filter casing superposed on and in communication with said regenerative casing through said means for interconnecting said casings, said separate passageways in said regenerative casing includes a first passageway circuit for supplying the first fluid into each of said filter casings, a second passageway circuit for supplying the second fluid to each of said fluid casings, and a third passageway circuit for receiving the second fluid with the absorbed component from said filter casings and for directing it through said means for regenerating the second fluid and for discharging the second fluid from said regenerative unit after its passage through said means for regenerating the second fluid.

4. A compact, self-contained regenerative filtration apparatus comprising at least one filter unit in which a first fluid is filtered for adsorbing a certain component of the first fluid and a regenerative unit for processing a second fluid used for removing the adsorbed component of the first fluid from said filter unit, said filter unit comprising an elongated rectangular parallelepiped casing, at least a pair of filters disposed within said casing, means forming passageways within said filter casing comprising a first passageway system for supplying the first fluid to said filters, a second passageway system for flowing the second fluid to said filters, a third passageway system for receiving the second fluid after its passage through said filters, and a fourth passageway system for conveying purified first fluid from said filters exteriorly of said filter casing, change-over valve means disposed in each of said first, second, third and fourth passageway systems for selectively regulating the flow of the first and second fluids through said filters, said regenerative unit including an elongated rectangular parallelepiped casing, means located within said casing for separating from the second fluid the component adsorbed from the first fluid within said filters in said filter unit, at least one first passageway within said regenerative casing for flowing the first fluid through said regenerative unit prior to passing it into said filter unit, at least one second passageway within said regenerative casing for conveying the second fluid through said regenerative unit for introduction into said filter unit, and at least one third passageway for receiving the second fluid from said filter unit and directing it through said separating means and discharging it from said regenerative unit, hangers secured to the upper corners of each of said filter casing and said regenerative casing, means located on the exterior of said filter casing and on the exterior of said regenerative casing for closely interconnecting said filter casing and regenerative casing for interconnecting said first passageway system in said filter casing to said first passageway in said regenerative casing, for interconnecting said second passageway system in said filter casing to said second passageway in said regenerative casing and for interconnecting said third passageway system in said filter casing to said third passageway in said regenerative casing.

5. A regenerative filtration apparatus, as set forth in claim 4, wherein said filter unit includes at least two said filter casings, said filter casings mounted on said regenerative casing with the lower surface of said filter casings superposed on the upper surface of said regenerative casing and with the elongated axes of said filter casings disposed substantially in parallel and extending substantially perpendicularly to the elongated axis of said regenerative casing, said means for interconnecting said filter casings to said regenerative casing including at least two spaced series of connections located on the top surface of said regenerative casing and a series of connections located in the bottom surface of each of said filter casings so that said series of connections on each of said filter casings can be attached to a different one of said series of connections in said regenerative casing.

* * * * *